United States Patent [19]

Sato et al.

[11] 4,005,261
[45] Jan. 25, 1977

[54] METHOD AND APPARATUS FOR PRODUCING A COMPOSITE STILL PICTURE OF A MOVING OBJECT IN SUCCESSIVE POSITIONS

[75] Inventors: Hiroki Sato, Yokohama; Hiroh Takahashi, Fujisawa, both of Japan

[73] Assignee: Sony Corporation, Tokyo, Japan

[22] Filed: Nov. 20, 1975

[21] Appl. No.: 633,686

[30] Foreign Application Priority Data

Nov. 26, 1974 Japan .......................... 49-136551

[52] U.S. Cl. .......................... 358/83; 178/DIG. 1; 340/173 CR; 273/183 R; 273/54 D; 273/DIG. 28

[51] Int. Cl.² .................... H04N 7/18; A63B 69/00

[58] Field of Search ....... 178/6.8, DIG. 1, DIG. 33; 340/173 CR; 273/183 R, 54 D, DIG. 28

[56] References Cited

UNITED STATES PATENTS

| | | | |
|---|---|---|---|
| 2,943,141 | 6/1960 | Knight | 178/DIG. 1 |
| 3,336,585 | 8/1967 | Macouski | 178/DIG. 33 |
| 3,623,027 | 11/1971 | Williams | 340/173 CR |
| 3,894,181 | 7/1975 | Mistretta | 178/6.8 |

*Primary Examiner*—Howard W. Britton
*Attorney, Agent, or Firm*—Lewis H. Eslinger; Alvin Sinderbrand

[57] ABSTRACT

A storage-type image pick-up tube having a shutter associated therewith and a memory device are synchronously operated to produce a composite video signal which, when repeatedly applied to a video monitor or other image display device, provides a composite still picture of a moving object in an initial position and changes from such position at intervals over a period of time. The synchronous operations comprise a first step of opening the shutter while operating the pick-up tube to pick-up an image of the object in its initial position and to produce a corresponding first video signal which is simultaneously stored in the memory device, a second step of closing the shutter while reading-out any signal previously stored in the memory device and storing the read-out signal in the pick-up tube, a third step of opening the shutter while operating the pick-up tube to pick-up an image of the object in a subsequent position and to produce a corresponding signal from which the signal then stored in the pick-up tube is subtracted for providing a resultant signal which is stored in the memory device in superposed relation to the signal previously stored in the memory device, and repeating the second and third steps cyclically at intervals for the duration of the prescribed period of time.

4 Claims, 10 Drawing Figures

METHOD AND APPARATUS FOR PRODUCING A COMPOSITE STILL PICTURE OF A MOVING OBJECT IN SUCCESSIVE POSITIONS

BACKGROUND OF THE INVENTION

1. Field of the Invention

This invention relates generally to a method and apparatus for studying and analyzing the movements of an object, such as, for example, a golfer's swing.

2. Description of the Prior Art

Video tape recording and reproducing apparatus has been used for studying and analyzing athletic movements such as, a golfer's swing. In the use of such apparatus, a video tape record is made of the golfer's swing or other athletic movement, and the recorded video signal is then played back and applied to a video monitor or other image display device so that the golf swing or other athletic movement can be studied and analyzed for correcting defects therein. With such video tape recording and reproducing apparatus, a slow-motion or stopmotion mode of operation can be selected during playback so as to provide either a slow-motion picture or successive still pictures by which the study and analysis of the golf swing or other athletic movement is facilitated. However, even during such slow-motion or intermittent stop motion playback of the recorded video signal, the picture or image appearing on the video monitor at any instant shows only the position of the golfer or other athlete at a respective point in the swing or movement so that it is still difficult to analyze the displayed position in relation to positions occurring earlier and later in the swing or movement. Further, the use of a video tape recording and reproducing apparatus for the described purposes is disadvantageous in that it requires relatively costly magnetic tape for recording and reproducing the video signal and the loading and unloading of the tape in the apparatus.

OBJECTS AND SUMMARY OF THE INVENTION

Accordingly, it is an object of this invention to provide an improved method and apparatus for the study and analysis of the movements of a moving object, such as, a golfer's swing or other athletic movement.

More specifically, it is an object of this invention to provide a method and apparatus for producing a composite video signal which, when repeatedly applied to a video monitor or other image display device, affords a composite still picture representing a moving object in an initial position and changes from such position at intervals over a period of time.

A further object is to provide a composite video signal, as aforesaid, through the use of a relatively simple apparatus which comprises a storage-type image pick-up tube, a shutter associated with such tube and a memory device, all of which are operated in synchronism with each other.

In accordance with an aspect of this invention the synchronous operations of the image pick-up tube, shutter and memory device comprise a first step of opening the shutter while operating the pick-up tube to pick up an image of the moving object in its initial position and to produce a corresponding first video signal which is simultaneously stored in the memory device, a second step of closing the shutter while reading-out any signal previously stored in the memory device and storing the read-out signal in the pick-up tube, a third step of opening the shutter while operating the pick-up tube to pick up an image of the moving object in a subsequent position and to produce a corresponding signal from which the signal then stored in the pick-up tube is subtracted for providing a resultant signal which is stored in the memory device in superposed relation to the signal previously stored in the memory device, and repeating the second and third steps cyclically at intervals for the duration of the prescribed period of time. Thus, at the conclusion of the prescribed period of time, the final composite video signal stored in the memory device may be repeatedly read-out to a monitor or image display device for causing the latter to display a composite still picture representing the initial position of the moving object and the changes from such initial position at the previously mentioned intervals over the period of time.

The above, and other objects, features and advantages of the invention, will be apparent in the following detailed description of an illustrative embodiment thereof which is to be read in connection with the accompanying drawings.

DESCRIPTION OF A PREFERRED EMBODIMENT

Figure 1:
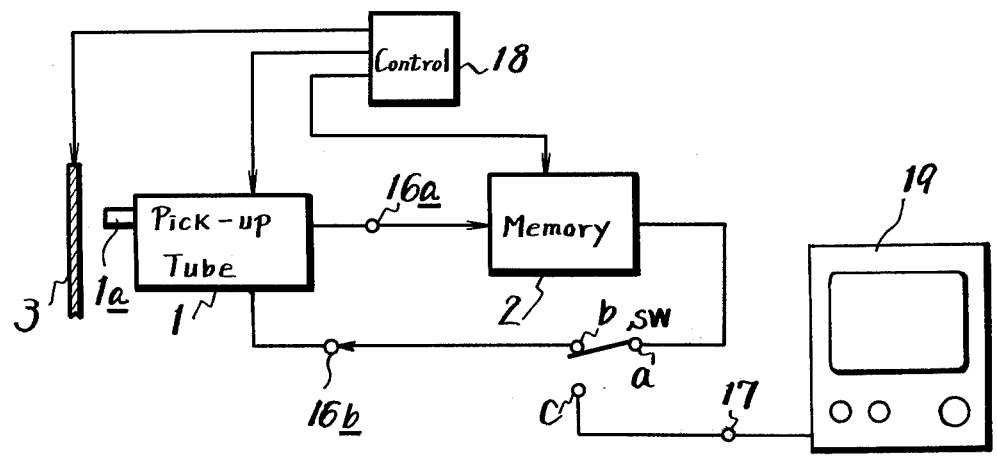
FIG. 1 is a schematic view diagrammatically illustrating an apparatus that may be used in accordance with an embodiment of this invention for producing the desired composite still picture.

Referring to the drawings in detail, and initially to FIG. 1 thereof, it will be seen that an apparatus that may be used for producing a composite video signal in accordance with this invention generally comprises a storage-type image pick-up tube 1, a memory device 2, a shutter 3 and a control device 18 by which pick-up tube 1, memory device 3 and shutter 3 are made to operate synchronously, as hereinafter described in detail.

Figure 2:
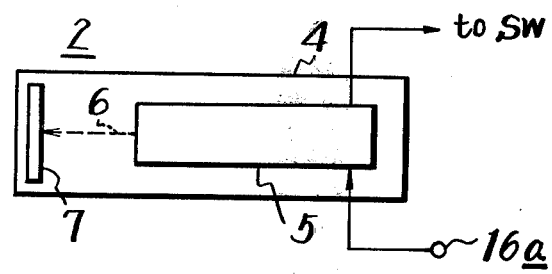
FIG. 2 is a schematic view illustrating a memory device that may be used in the apparatus of FIG. 1.
Figure 3:
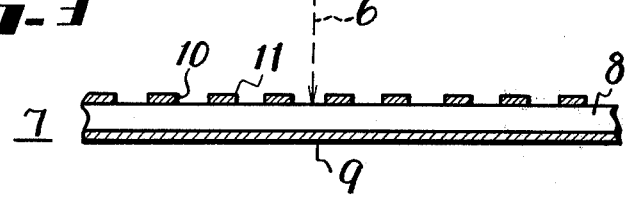
FIG. 3 is a fragmentary, enlarged cross-sectional view of a target structure that is included in the memory device of FIG. 2.

As shown in FIG. 2, a conventional memory device 2 for use in accordance with this invention may be constituted by a storage tube comprising a tube envelope 4 containing an electron gun 5 which emits an electron beam 6 that scans a target structure 7. As shown on FIG. 3, the target structure 7 may include an insulating member 8, for example, in the form of a glass plate or the like, having a metal layer of chromium or the like deposited on the surface of glass plate 8 facing away from gun 5 to form a target electrode 9, while the other surface of glass plate 8, that is, the surface scanned by beam 6, has a signal electrode 11 deposited thereon. Such signal electrode 11 is formed with a plurality of apertures 10 which may be in the form of elongated slits or circular holes.

The storage tube constituting memory device 2 has an erasing and priming mode of operation, a writing mode of operation and a read-out mode of operation. In the erasing and priming mode of operation, electron beam 6 scans the target structure 7 while, for example, the voltage $V_T$ applied to target electrode 9 has a value of 200V and the voltage $V_P$ applied to signal electrode 11 has a value of 180V, that is, 20V lower than the voltage applied to target electrode 9. Since the secondary emission ratio $\delta$ of glass plate or insulating member 8 is greater than 1 with respect to the electron beam of about 200eV, the scanning by the electron beam of the surface of glass plate 8 exposed at the apertures 10 of signal electrode 11 induces a voltage $V_S$ which is increased in positive polarity by the secondary emission resulting from the impingement of the electron beam 6 and which balances at the potential $V_P$ of the signal electrode 11, that is, at 180V. Accordingly, a voltage $E_S = V_T - V_S$, that is, of 20V, is formed across each capacitive element formed in the insulating member or glass plate 8 at each aperture 10.

After the above condition has been established by the erasing and priming mode of operation, the writing mode of operation of memory device 2 is established in the following manner. While the voltage $V_T$ applied to target electrode 9 is maintained at the same value as for the erasing and priming operation, for example, at 200V, the voltage $V_P$ applied to signal electrode 11 is increased to a value higher than the voltage $V_T$, for example, to a value of 220V. With the voltages $V_T$ and $V_P$ having the values 200V and 220V, respectively, the writing operation is effected by causing electron beam 6 to scan target structure 7 while the electron beam is density modulated in accordance with the signal to be written. As a result of such density modulation of the electron beam 6 while scanning target structure 7, the areas of the surface of insulating member or glass plate 8 exposed at apertures 10 undergo varying changes in potential between the surface potential $V_S = 180V$ applied during the previous erasing and priming operation and the voltage $V_P = 220V$ applied to signal electrode 11 during the writing operation. More particularly, at any exposed surface area of glass plate 8 scanned by electron beam 6 when the latter is cut off by the density modulation, the surface potential $V_S$ is maintained at the original value of 180V. However, at those exposed surface areas of glass plate 8 scanned by beam 6 when the latter is modulated to have a high electron density, the exposed surface areas are charged to positive polarity by reason of the secondary emission ratio $\delta$ of glass plate 8 being greater than 1 and may reach a maximum potential of 220V. In other words, the surface areas of glass plate 8 exposed at the apertures 10 of signal electrode 11 have their surface potentials varied in the range between 180 and 220V in a pattern which corresponds to the write-in signal used for density modulation of beam 6 during the writing operation. Therefore, the potentials across the capacitive elements defined in insulating member or glass plate 8 at the apertures 10 are distributed within the range of $E_S = V_T - V_S$, that is, in the range from 200–180 to 200–220, or from 20 to −20V.

In the read-out mode of operation of memory device 2, target electrode 9 is given a negative potential for example, a potential $V_T$ of −20V, while a relatively low positive voltage is applied to signal electrode 11, for example, the latter has a voltage $V_P$ of 10applied thereto. Since the potentials $E_S$ across the capacitive elements in the insulating member or glass plate 8 are distributed in the range of 20 to <20V at the completion of the writing operation, the application of the potential $V_T = -20V$ to target electrode 9 for the read-out mode of operation results in the potential $V_S = V_T - E_S$ at the surface areas of glass plate 8 exposed at apertures 10 being in the range from −20−20 to −20+20, that is, from −40V to 0V. With the foregoing 40V range of variation of the potential at the exposed surface areas of glass plate 8, the electron beam 6 is made to scan the target structure 7 and the electron beam is modulated in accordance with the variations in the surface potentials $V_S$ at the areas of insulating member or glass plate 8 exposed through apertures 10. More specifically, as the negative value of the potential $V_S$ at a surface area of glass plate 8 exposed at an aperture 10 is increased, the arrival of electrons in beam 6 at the adjacent portion of electrode 11 is impeded and, consequently, the beam current is modulated in accordance with the pattern of potentials established by the prior writing operation, thereby to produce a corresponding signal output.

After a read-out operation of memory device 2, the previously described erasing and priming operation may be performed prior to the next writing operation. However, as hereinafter described, the read-out operation of memory device 2 may be immediately followed by a new writing operation, that is, without an intervening erasing and priming operation, in which case, the signal applied to memory device 2 in the second writing operation is superposed or overlapped on the signal already stored in the memory device.

Figure 4:
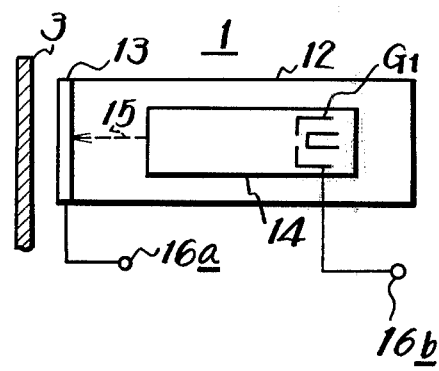
FIG. 4 is a schematic view illustrating a storagetype pick-up tube that may be used in the apparatus of FIG. 1.

As shown in FIG. 4, a conventional storage-type pick-up tube 1 for use in accordance with this invention may be in the form of a vidicon tube having an envelope 12 with a face plate or target 13 at one end which is provided with a photoelectric conversion layer on its inner surface. An electron gun 14 is disposed within envelope 12 for emitting an electron beam 15 which scans the target or face plate 13. Further, an optical system 1a (FIG. 1) is provided for the pick-up tube 1 for projecting an optical image of an object in its field of view onto the photoelectric conversion layer of target 13 when the associated shutter 3 is in its open condition. In the pick-up mode of tube 1, the scanning of target 13 by electron beam 15 causes a video signal corresponding to an image projected onto the photoelectric conversion layer through open shutter 3 to be provided at an output terminal 16a which is connected with the photoelectric conversion layer. The electron gun 14 of storage-type pick-up tube 1 is further shown to have a first grid $G_1$ which may be connected with an input terminal 16b to receive a signal, for example, the signal read-out from memory device 2. In the storage mode of tube 1, shutter 3 is in its closed condition and electron beam 15 is density modulated by a signal applied to grid $G_1$, as aforesaid, so that the scanning of the photoelectric conversion layer of target 13 by the densitymodulated beam causes the signal applied to grid $G_1$ to be stored in the photoelectric conversion layer as a negative potential pattern on the latter.

Referring again to FIG. 1, it will be seen that the signal output terminal 16a of pick-up tube 1 is connected to the writing input of memory device 2, and further that the read-out output of memory device 2 is connected to the movable contact $a$ of a change-over switch SW. The switch SW has fixed contacts $b$ and $c$ selectively engageable by movable contact $a$ and being respectively connected to the signal input terminal 16$b$ of pick-up tube 1 and to an output terminal 17 to which a conventional video monitor or image display device 19 may be connected.

The control device 18 may be constituted by conventional electronic or mechanical components for controlling the operations of storage-type pick-up tube 1, memory device 2 and shutter 3 in a synchronous manner so that, at intervals during a period of time when the movements to be studied and analyzed are occurring, control device 18 simultaneously establishes the open condition of shutter 3, the pick-up mode of pick-up tube 1 and the writing mode of memory device 2, and, between such intervals, control device 18 simultaneously establishes the closed condition of shutter 3, the storage mode of pick-up tube 1 and the read-out mode of memory device 2, as hereinafter described in detail More particularly, the method of operation of the above described apparatus in accordance with this invention involves successive first, second and third steps, whereupon the second and third steps are repeated cyclically at intervals until the conclusion of the period of time during which the movements to be studied and analyzed are occurring. If, for example, it is assumed that the movements to be studied and analyzed are those involved in a golf swing, then the successive phases of the swing may be considered to be represented by the images appearing on FIGS. 5A–5E which may correspond to five successive frames of a motion picture of the swing.

Figure 5A:
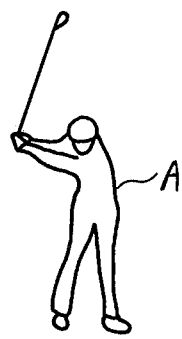
FIGS. 5A-5E are views illustrating images corresponding to successive stages of a golfer's swing, and to which reference will be made in explaining the method embodying this invention.
Figure 5B:
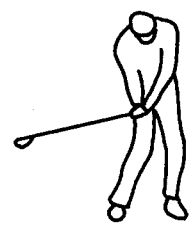

With switch SW in the position shown on FIG. 1 and with memory device 2 having undergone an erasing and priming operation, as previously described, in the first step of the method of operation according to this invention, control device 18 establishes the open condition of shutter 3, the pick-up mode of tube 1 and the writing mode of memory device 2. Thus, the image A of FIG. 5A is projected by optical assembly 1$a$ on target 13 of pick-up tube 1 which provides a corresponding video signal at its output terminal 16$a$, and such video signal is applied to memory device 2 which, in its writing mode of operation, is effective to store the video signal corresponding to the image A representing the initial position of the golfer.

In the second step according to this invention, control device 18 establishes the closed condition of shutter 3, the storage mode of pick-up tube 1 and the read-out mode of memory device 2. Thus, the video signal previously stored in memory device 2 and corresponding to the image A of the initial position is read-out of memory device 2 and applied to the grid $G_1$ of pick-up tube 1 so that, as the beam 15 scans target 13, the signal corresponding to image A is stored in the photoelectric conversion layer of target 13. In connection with the foregoing storage function of pick-up tube 1, it will be noted that, when shutter 3 is in its closed condition so that no light falls on target 13, the photoelectric conversion layer of target 13 exhibits a high resistance, that is, is in an insulating condition. Thus, when the density-modulated electron beam 15 scans the photoelectric conversion layer, electrons are stored in such layer to provide a negative potential pattern determined by the density modulation of electron beam 15, and which corresponds to the image A.

Figure 5C:
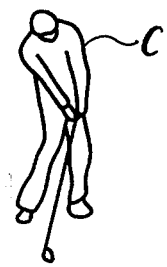
Figure 5D:
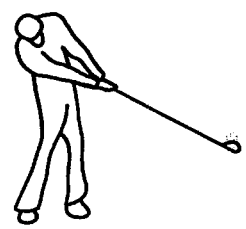
Figure 5E:
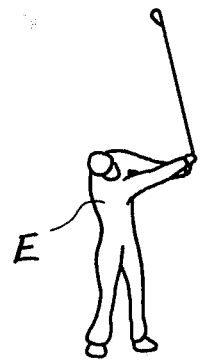

In the third step of the operation according to this invention, control device 18 returns shutter 3 to its open condition and simultaneously establishes the pick-up mode of tube 1 and the writing mode of memory device 2. Thus, in the third step, the image C appearing on FIG. 5C is projected by optical assembly 1$a$ onto target 13 of tube 1. However, since the photoelectric conversion layer of target 13 already has the signal corresponding to the image A stored thereon in the form of a negative potential pattern, light projected onto the photoelectric conversion layer in the form of the image C serves to discharge the negative electric charges at the regions of the photoelectric conversion layer where the image C coincides with the image A so that the photoelectric conversion layer is restored to its highly resistive or insulating condition at such regions. Therefore, as the photoelectric conversion layer is scanned by beam 15 with the image C being projected on target structure 13, the resultant signal obtained at output terminal 16$a$ corresponds to the subtraction of image A from image C, that is, the resultant signal is obtained only in respect to those portions of image C that are changed or displaced from the corresponding portions of image A and no signal is obtained at output terminal 16$a$ in respect to the overlapped or coinciding portions of images A and C. Such resultant signal obtained at output terminal 16$a$ of pickup tube 1 is applied to memory device 2 and stored in the latter in superposed relation to the signal previously stored in the memory device so that the signal then stored in memory device 2 represents the image A with the addition thereto of those portions of the image C which are different or displaced from the corresponding portions of the image A. The portions of the image A which are not overlapped by the image C may remain stored on the photoelectric conversion layer of target 13 as a negative potential pattern and give rise to a respective signal at the terminal 16$a$ when scanned by electron beam 15. However, such signal corresponding to the portions of image A that are not overlapped by the image c may be cancelled by adjusting the bias conditions of pick-up tube 1 so as to lower the potential of its first grid $G_1$. Thus, the signal derived at output terminal 16$a$ and stored in memory device 2 in superposed relation to the signal corresponding to the image A already stored in memory device 2 may be made to correspond to only those portions of the image C which are changed or displaced from the corresponding portions of the image A, and without duplicating those portions of the image A which are not overlapped by the corresponding portions of image C.

As previously mentioned, the above described second and third steps are repeated cyclically at intervals for the duration of the period of time during which the movements to be studied or analyzed are occurring. Thus, for example, after the third step, the second step is repeated, that is, shutter 3 is closed while the signal stored in memory device 2 is readout and stored in pickup tube 1 as a negative potential pattern on the photoelectric conversion layer of target 13. At this time, the negative potential pattern formed on the photoelectric conversion layer corresponds to a composite of image A and those portions of image C which are changed or displaced from the corresponding portions of image A. Then, the above described third step is repeated, that is, shutter 3 is opened to permit the image E of FIG. 5E to be projected on the photoelectric conversion layer of target 13. As in the previously described third step, the composite image stored on the photoelectric conversion layer, that is, the stored image A and portions of the image C which are changed or displaced from the corresponding portions of the image A, are subtracted from the projected image E so that the scanning of the photoelectric conversion layer by electron beam 15 causes a resultant signal to be provided at terminal 16a, which resultant signal corresponds only to those portions of the image E which are changed or displaced from the corresponding portions of the images A and C. Once again, the resultant signal obtained at terminal 16a is simultaneously stored in memory device 2 in superposed relation to the previously stored signal corresponding to the composite of image A and the portions of the image C displaced therefrom.

Figure 6:
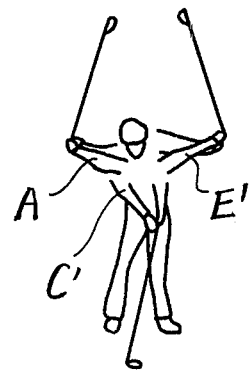
FIG. 6 is a view illustrating, by way of example, the composite still picture or image that is obtained in accordance with this invention, and which corresponds to the images of a golfer's swing shown on FIGS. 5A-5E.

It will be apparent that, at the conclusion of the period of time required for the movements which are to be studied or analyzed, there is stored in memory device 2 a final composite video signal corresponding to the initial image A and to the portions of the images C and E which are displaced or changed from the corresponding portions of the intial image A, for example, as at C' and E' on FIG. 6.

At the conclusion of the period of time required for the movements which are to be studied or analyzed, that is, upon the completion of the pick-up and storing operations described above, switch SW is changed over to engage its movable contact a with fixed contact c and the final composite video signal stored in memory device 2 is repeatedly read-out to the output terminal 17 with the result that the monitor or image display device 19 connected to such terminal 17 will display a corresponding composite still picture, for example, as shown on FIG. 6. Such composite still picture represents the initial position of the moving object, that is, the image A, and the changes from such initial position in the images C and E occurring at intervals over the period of time required for the studied movements.

If, as shown on the drawings, the images A, C and E that are successively picked-up by tube 1 at intervals represent successive phases or stages of a golfer's swing, the resulting composite still picture produced in accordance with the present invention, as shown on FIG. 6, clearly indicates the successive movements of the golfer throughout the swing, so that such movements can be studied or analyzed relative to each other, as by a golf instructor, and corrections or improvements in technique can be suggested therefrom. Although the invention has been specifically described as applied to the study and analysis of a golfer's swing, it will be apparent that it may be similarly applied to other athletic activities or to the study and analysis of the movements of any other moving objects.

Further, it is to be noted that the apparatus used in connection with this invention may be of the type in which two fields constitute each frame, or of the type in which a single field makes up each frame.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A method of operating a storage-type image pick-up tube provided with a shutter, and a memory device for producing a composite video signal representing an image of a moving object in an initial position and changes from said position of the object at intervals over a period of time, comprising:

a first step of opening said shutter while operating said pick-up tube to pick-up an image of said object in an initial position thereof and to produce a corresponding first video signal, and simultaneously applying said first video signal to said memory device for storage in the latter;

a second step of closing said shutter while readingout the signal previously stored in said memory device and storing the read-out signal in said pick-up tube;

a third step of opening said shutter while operating said pick-up tube to pick-up an image of said object in a subsequent position thereof and to produce a corresponding signal from which the signal then stored in the pick-up tube is subtracted for providing a resultant signal representing the changes in said subsequent position from said initial position, and simultaneously applying said resultant signal to said memory device for storage in the latter in superposed relation to the signal previously stored in the memory device; and repeating said second and third steps cyclically at intervals for the duration of said period of time so that, at the conclusion of said period of time, said memory device has stored therein a final composite video signal corresponding to said first signal with the successive resultant signals superposed thereon.

2. The method according to claim 1; in which, at the conclusion of said period of time, said final composite video signal stored in said memory device is repeatedly read-out to an image display device for causing the latter to display a composite still picture representing said initial position of the moving object and the changes from said initial position at said intervals over said period of time.

3. Apparatus for producing a composite video signal representing a moving object in an initial position and changes from said position of the object at intervals over a period of time, comprising:

shutter means having an open condition and a closed condition;

storage-type image pick-up means shielded by said shutter means in said closed condition of the latter and including an input terminal and an output terminal, said pick-up means having a storage mode for storing a signal applied to said input terminal and an image pick-up mode for picking-up an image of the object through said shutter means in the open condition of the latter and producing a corresponding video signal from which any signal previously stored in said pick-up means is subtracted for providing a resultant video signal at said output terminal;

memory means connected with said output terminal of the pick-up means and having a writing mode in which a video signal appearing at said output terminal is stored in said memory means in superposed relation to any signal previously stored in said memory means, and a read-out mode in which the signal stored in said memory means is read-out therefrom;

means for applying the read-out signal from said memory means to said input terminal of said pick-up means for storage in the latter; and control means which, at intervals during said period of time, simultaneously establishes said open condition of the shutter means, said pick-up mode of the pick-up means and said writing mode of the memory means, and, between said intervals, simultaneously establishes said closed condition of the shutter means, said storage mode of the pick-up means and said read-out mode of the memory means.

4. Apparatus according to claim 3; further comprising image display means; and in which said means for applying the read-out signal from said memory means to said input terminal of the pick-up means includes switch means which, at the conclusion of said period of time, is actuable to apply the repeatedly read-out signal from said memory means to said image display means so that the latter displays a composite still picture representing said object in said initial position and the changes from said position at said intervals during said period of time.

* * * * *